United States Patent [19]

Takeuchi et al.

[11] Patent Number: 5,582,073
[45] Date of Patent: Dec. 10, 1996

[54] SHIFT LEVER ASSEMBLY FOR AUTOMATIC TRANSMISSION

[75] Inventors: Yasunori Takeuchi; Hidenobu Kamiya; Kazuo Takahashi; Moritaka Makino, all of Kariya, Japan

[73] Assignee: Tsuda Kogyo Kabushiki Kaisha, Kariya, Japan

[21] Appl. No.: 457,241

[22] Filed: Jun. 1, 1995

[30] Foreign Application Priority Data

| | | | |
|---|---|---|---|
| Sep. 26, 1994 | [JP] | Japan | 6-229866 |
| Sep. 27, 1994 | [JP] | Japan | 6-231329 |
| Oct. 20, 1994 | [JP] | Japan | 6-255432 |
| Nov. 10, 1994 | [JP] | Japan | 6-276563 |

[51] Int. Cl.⁶ .......... F16H 63/32; F16H 63/38; G05G 1/28
[52] U.S. Cl. .......... 74/475; 74/538; 74/566; 116/28.1; 192/4 A
[58] Field of Search .......... 74/473 R, 475, 74/538, 566; 116/28.1, DIG. 20; 192/4 A

[56] References Cited

U.S. PATENT DOCUMENTS

| | | | |
|---|---|---|---|
| 4,503,730 | 3/1985 | Irvin | 74/566 |
| 4,964,359 | 10/1990 | Richmond | 116/28.1 |
| 5,150,593 | 9/1992 | Kobayashi et al. | 74/538 X |
| 5,272,935 | 12/1993 | Heinemann et al. | 74/537 X |

*Primary Examiner*—Allan D. Herrmann
*Attorney, Agent, or Firm*—Dennison, Meserole, Pollack & Scheiner

[57] ABSTRACT

A shift lever assembly for an automatic transmission, in which a lever knob on top of a lever shaft is formed integral with the lever body and has a width which is smaller than the width of an opening formed in a shift position indication panel. The assembly includes a lever support for pivotally supporting the shift lever body and components such as a shift lock release actuator. This assembly can be secured to a vehicle body. The shift position indication panel is mounted by passing the lever knob through the panel opening. A slide cover and the shift position indicator panel are arcuate in shape with the center thereof constituted by the pivoting center of the lever body. The slide cover is made integral with the lever body. The slide cover has a detent groove formed in its back surface. A shift position indicator support is formed on one side of the slide cover. The shift lock release actuator is provided in the turning plane of the lever body, thus simplifying a lock release mechanism.

12 Claims, 13 Drawing Sheets

SHIFT LEVER ASSEMBLY FOR AUTOMATIC TRANSMISSION

BACKGROUND OF THE INVENTION

1. Field of the Invention

This invention relates to shift lever assemblies for operating automatic transmissions used in vehicles.

2. Description of the Prior Art

FIG. 11 shows an example of prior art shift lever assembly for operating an automatic transmission in sectional view. As shown, the shift lever assembly comprises a lever body 180 having a lever shaft 182 and a lever knob 186. The lever knob 186 is coupled to the upper end of the lever shaft 182. The lever shaft 182 has its lower end supported by a support shaft 188 on a lever support 190 such that the lever body 180 can be turned about the support shaft 188 in directions of shifting operation. The shift position of the lever body 180 can be seen by observing a shift position indication panel 192 which is secured to the lever support 190. The shift position indication panel 192 has an opening 194 through which the lever body 180 can be shifted.

The opening 194 of the shift position indication panel 192 is elongate in shape, covering the range of shifting of the lever body 180. The width of the opening 194, however, is smaller than the width of the lever knob 186. Therefore, when assembling the shift lever assembly, the lever shaft 182 is first mounted by the support shaft 188 on the lever support 190 before mounting the lever knob 186 thereon. Then, the lever shaft 182 is passed through the opening 194 of the shift position indication panel 192, which is then mounted on the lever support 190. Subsequently, the lever knob 186 is secured by screws (not shown) to a metal pipe 184 which is inserted in the lever shaft 182.

In this way, the lever body 180 requires coupling of the lever shaft 182 and the lever knob 186 fabricated as separate parts by means of screws. This means that the insert position of the metal pipe 184 in the lever shaft 182 and the coupling position of the lever knob 186 with respect to the metal pipe 184 may fluctuate. These fluctuations tend to deteriorate the positioning accuracy of the lever knob 186. In addition, since the assembling of the lever assembly requires a step of coupling the lever shaft 182 and the lever knob 186, the productivity of the assembly is correspondingly reduced.

The opening 194 of the shift position indication panel 192 is covered by a slide cover 130 shown in FIG. 12, and a shift position indicator 132 is provided on one side of the slide cover 130. As shown in FIG. 12, the shift position indicator 132 provided on one side of the slide cover 130, has a rectangular position indication tape accommodation member 132a having three, low level side walls 134 to 136. A rectangular position indication tape 140 is accommodated in and applied to the accommodation member 132a. The position indication tape 140 usually consists of a red fluorescent adhesive tape.

By a shifting operation of the lever body 180, the shift position indicator 132 is caused to move along the underside of a shift position indication panel 192, as shown in FIG. 13. The shift position indication panel 192 further has openings or windows 117 formed at its positions corresponding to respective shift positions of the lever body 180. At each shift position, the shift position indicator 132 is found right underneath the corresponding window 117.

As best shown in FIG. 13, when the shift position indicator 132 is looked at from driver's eye point 150 through the window 117, an edge 140a of the position indication tape 140 is seen as exposed. Meanwhile, the position indication tape 140 is applied manually to the position indication tape accommodation member 132a, and it is considerably difficult to secure a given positioning accuracy of the application of the position indication tape 140.

Deviations of the application position of the position indication tape 140 with respect to the position indication tape accommodation member 132a, are undesired from the standpoint of ready confirmation of the indication. It is therefore necessary to apply the position indication tape 140 very carefully. This leads to reduced operability.

FIG. 14 is a sectional view showing the prior art shift lever assembly for automatic transmission. For the purpose of closing the opening 194 of the shift position indication panel 192, the slide cover 130, which is made of a soft resin and which has a strip-like shape, is mounted such that it is moved along an arcuate design curve of the shift position indication panel 192 in an interlocked relation to the shifting operation of the lever body 180.

For the movement of the slide cover 130 of a soft resin along the curved line of the shift position indication panel 192 in response to the shifting operation of the lever body 180, it is necessary to guide the slide cover 130 with a guide groove and other position regulation members provided along the opening 194 of the shift position indication panel 192. This complicates the shape of the lever support 190, thus leading to increased cost of manufacture. Further, to permit displacement of the slide cover 130 relative to the lever body 180 in the axial direction thereof at the time of shifting operation, the lever body 180 is inserted with a play through a hole formed in the slide cover 130.

Thus, when the lever body 180 is moved in tile shifting operation, the slide cover 130 receives frictional resistance and is displaced relative to the lever body 180. As a result, a deviation is produced between the shift position of the lever body 180 and the position of the shift position indicator 132, thus resulting in inaccurate shift position indication.

Moreover, it is required to provide guide groove and other position restriction means for the shift position indication panel 192 and also form the slide cover 130 from a resin material which is soft, wear-resistant and hence expensive, thus leading to increased cost.

In FIGS. 15 to 17, a shift lock mechanism of the prior art shift lever assembly is shown. FIG. 15 is a plan view showing the shift lever assembly. FIG. 16 is a plan view showing the internal construction of the assembly. FIG. 17 is a side sectional view showing the assembly.

In the lever body 180 noted above, a detent rod 160 is assembled for axial displacement. A detent pin 161 is secured to a lower portion of the detent rod 160 such that it penetrates an opening of the lever body 180 to the outside. By depressing a knob button (not shown) provided on the lever knob 186 at the upper end of the lever body 180, the detent rod 160 is displaced downward against the biasing force of a return spring.

The detent pin 161 is found in a detent groove 114 formed in the lever support 190. The biasing force of the return spring acting on the detent rod 160 normally holds the detent pin 161 to be in an upper edge recess of the detent groove 114. The detent rod 160, detent pin 161, detent groove 114 and related parts constitute a detent mechanism.

In the shift lever assembly, for executing an operation of shifting the lever body 180 from a parking position P to, for instance, a reverse position R which is one of running speed positions, or executing a reverse shifting operation, the detent rod 160 is displaced downward by depressing the knob button (not shown). As a result, the lock by the detent mechanism is released, thus making it possible to shift the lever body 180 for a shifting operation.

Now, a shift lock mechanism for locking the detent pin 161 against downward displacement when the lever body 180 is in the parking range P, will be described.

A lock plate 199 is provided for vertical movement on the lever support 190. The lock plate 199 has a locking recess 191 in which the detent pin 161 can be received when the lever body 180 is shifted from the reverse position R to the parking position P. FIG. 17 shows a state of the shift lever assembly in which the detent pin 161 is received in the locking recess 191 and the lock plate 199 is held in a position raised by the return spring acting on the detent rod 160.

Meanwhile, a shaft 196 having a pair of, i.e., right and left, lock levers 195 is rotatably supported on the lever support 190. In the state shown in FIG. 17, one of the lock levers 195 has its upper end lock portion 197 found in a notch 192 formed in the lock plate 199. This state corresponds to a lock state of the detent mechanism. In this state, if it is intended to cause downward displacement of the lock plate 199, the notch 192 strikes the lock portion 197 of the lock lever 195, thus blocking further downward displacement.

The lever support 190 further supports a solenoid 170 which is an electric actuator. The solenoid 170 is controlled by a control computer (not numbered). When the brake pedal of a vehicle is depressed with the lever body 180 in the parking position, the solenoid 170 is energized to pull a plunger 172. When the brake pedal is released, it is de-energized.

A solenoid rod 181 is coupled to the plunger 172 of the solenoid 170. Between the solenoid rod 181 and solenoid 170, a spring 175 is provided to bias the solenoid rod 181 in an advancing direction.

The lock lever 195 is rotatably coupled by a pin 187 to the other lock lever 195. The solenoid rod 180 has an inclined cam face 185. Facing the cam face 185 is an inclined cam face (not numbered) formed at the lower end of an operating rod 151 of a lock release button 150 which is assembled for vertical displacement on the lever support 190. The solenoid 181 thus can be retreated (i.e., moved to the left in FIG. 17) against the biasing force of the spring 175 by manually pushing down the lock release button 150.

In this shift lock mechanism, when the brake pedal is not depressed with the lever body 180 in the parking position P, if it is intended to push down the detent rod 160, the downward displacement of the interlocked lock plate 199 is blocked by the engagement between the notch 192 and the lock portion 197 of the lock lever 195. Thus, the lock of the detent mechanism can not be released, and hence the lever body 180 can not be shifted from the parking position P to a different position.

When the brake pedal is depressed in this state, the solenoid 170 is energized, causing the solenoid rod 181 to be retreated together with the plunger 172 against the biasing force of the spring 175. Thus, the lock lever 195 is retreated to a position shown by phantom line in FIG. 17, thus bringing about a lock release state. The lock release may also be realized by manually pushing down the lock release button 150.

In the lock release state, the detent rod 160 can be displaced downward for shifting the lever body 180 from the parking position to a different position.

The lever body 180 having been shifted to a different position from the parking position, can be shifted back to the parking position with the detent rod 160 held displaced downward. When the detent pin 161 is restored upward in its state of engagement in the locking recess 191 of the lock plate 199, the shift lock mechanism is again brought to the lock state.

In the prior art shift lock mechanism as described, many intermediate parts such as the solenoid rod 181, lock lever 195 and lock plate 199 are provided between the solenoid 170 and the detent rod 160. The necessity of these intermediate members stems from the construction for blocking the downward displacement of the detent pin 161 of the detent rod 160.

Problems posed by the presence of many intermediate parts are as follows.

(1) The construction is complicated.

(2) It is difficult to realize a compact construction.

(3) Cost is increased.

(4) The productivity is low.

(5) The shift lock range is readily subject to fluctuations, and it is difficult to ensure a given shift lock range accuracy.

(6) The coupling portions of the intermediate parts are subject to great frictional resistances. Therefore, the operability is low, and the feel of manually pushing down the lock release button is reduced.

SUMMARY OF THE INVENTION

An object of the invention is to permit making the lever shaft and the lever knob of the lever body integral with each other, thus reducing the number of parts and the number of assembling steps.

The shift lever assembly according to the invention comprises a lever support secured to a vehicle body and substantially cylindrical in shape with a peripheral wall and open at the top, a lever body pivotally supported by the lever support, the lever body extending upward beyond the open top of the lever support and capable of being turned within the substantially cylindrical lever support, and a shift position indication panel secured to the lever support such as to close the open top thereof and having an opening elongate in the direction of turning of the lever body, the lever body being inserted through the opening. In the shift lever assembly thus constructed, the lever body includes a shift lever and a lever knob integral therewith. The lever knob has a width smaller than the width of the opening in the shift position indication panel so that it is possible to insert the shift position indication panel in a state where the lever body has been pivotally mounted on the lever support.

The shift lever assembly according to the invention thus can be assembled by mounting the shift position indication panel on the lever support only after assembling the lever body onto the lever support. It is thus possible to reduce the number of parts and the number of assembling steps.

Another object of the invention is to reduce the number of parts and the number of assembling steps, and hence reduce the cost of manufacture, by making the slide cover which has been a separate part in the prior art to be integral with the lever body.

According to the invention, the slide cover is formed such that it is integral with the lever body, and the slide cover and the shift position indication panel are formed such that they are arcuate with the center thereof constituted by the center of turning of the lever body.

A further object of the invention is to accurately position the shift position indicator relative to the indication window so that the shift position indication can be seen clearly through the indication window.

According to the invention, the arcuate slide cover is formed as an integral part of the lever body, and the shift position indicator support is formed such that it is integral with one side of the slide cover. The shift position indicator support is formed with a shift position indication tape accommodation portion and an edge portion extending thereover.

A still further object of the invention is to provide for a nodal sense with less fluctuations when operating the lever body. To this end, the arcuate slide cover is formed such that it is an integral part of the lever body, while forming a detent groove in the back surface of the slide cover. In this construction, the detent groove is formed at a position spaced apart from the center of turning of the lever body. This has an effect of reducing nodal sense fluctuations with individual products.

The above and other objects, features and advantages of the invention will become more apparent from the detailed description of the preferred embodiment of the invention when the same is read with reference to the accompanying drawings.

DETAILED DESCRIPTION OF THE PREFERRED EMBODIMENT

A preferred embodiment of the invention will now be described with reference to the drawings.

Figure 1:
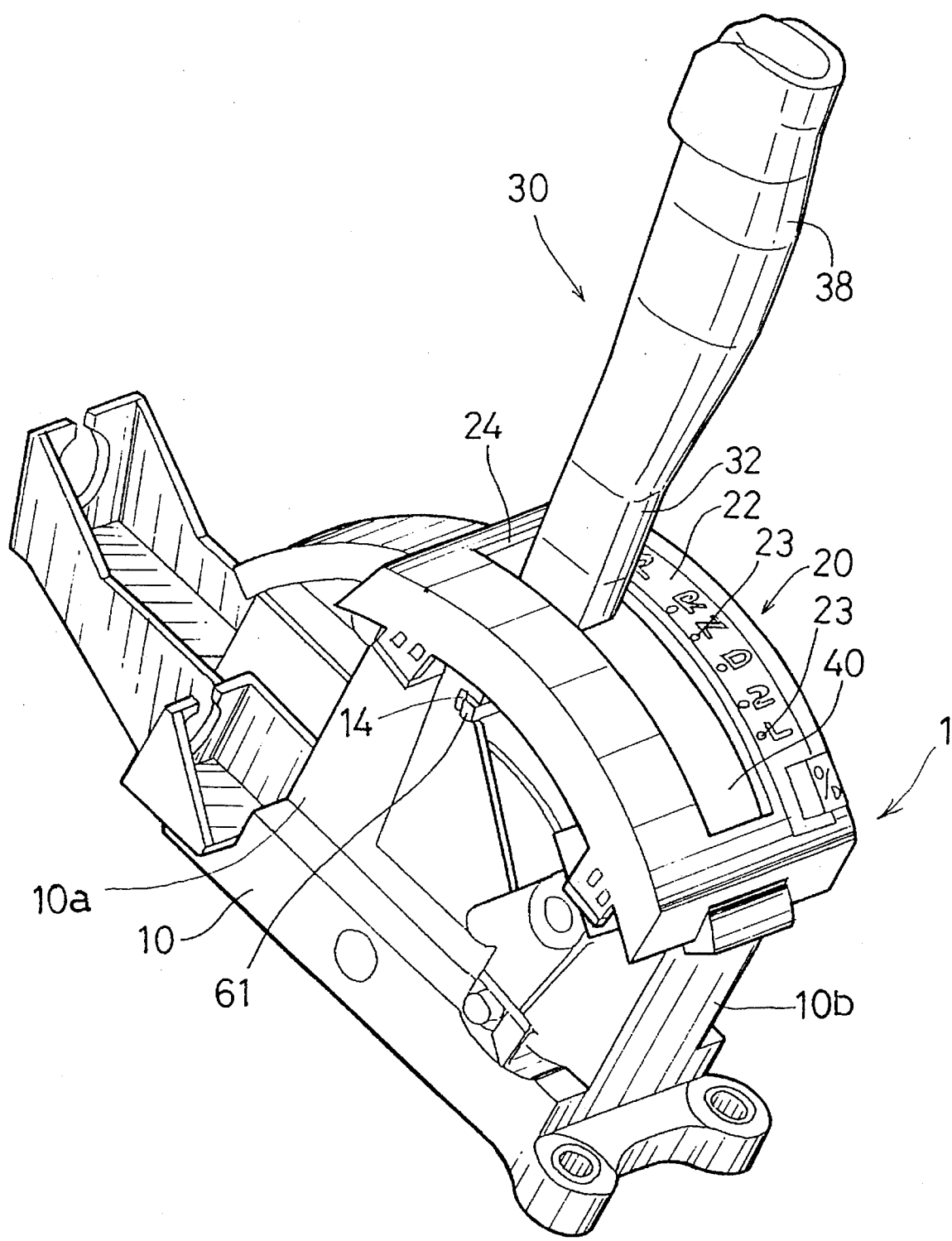
FIG. 1 is a perspective view showing a shift lever assembly for an automatic transmission according to an embodiment of the invention.
Figure 2:
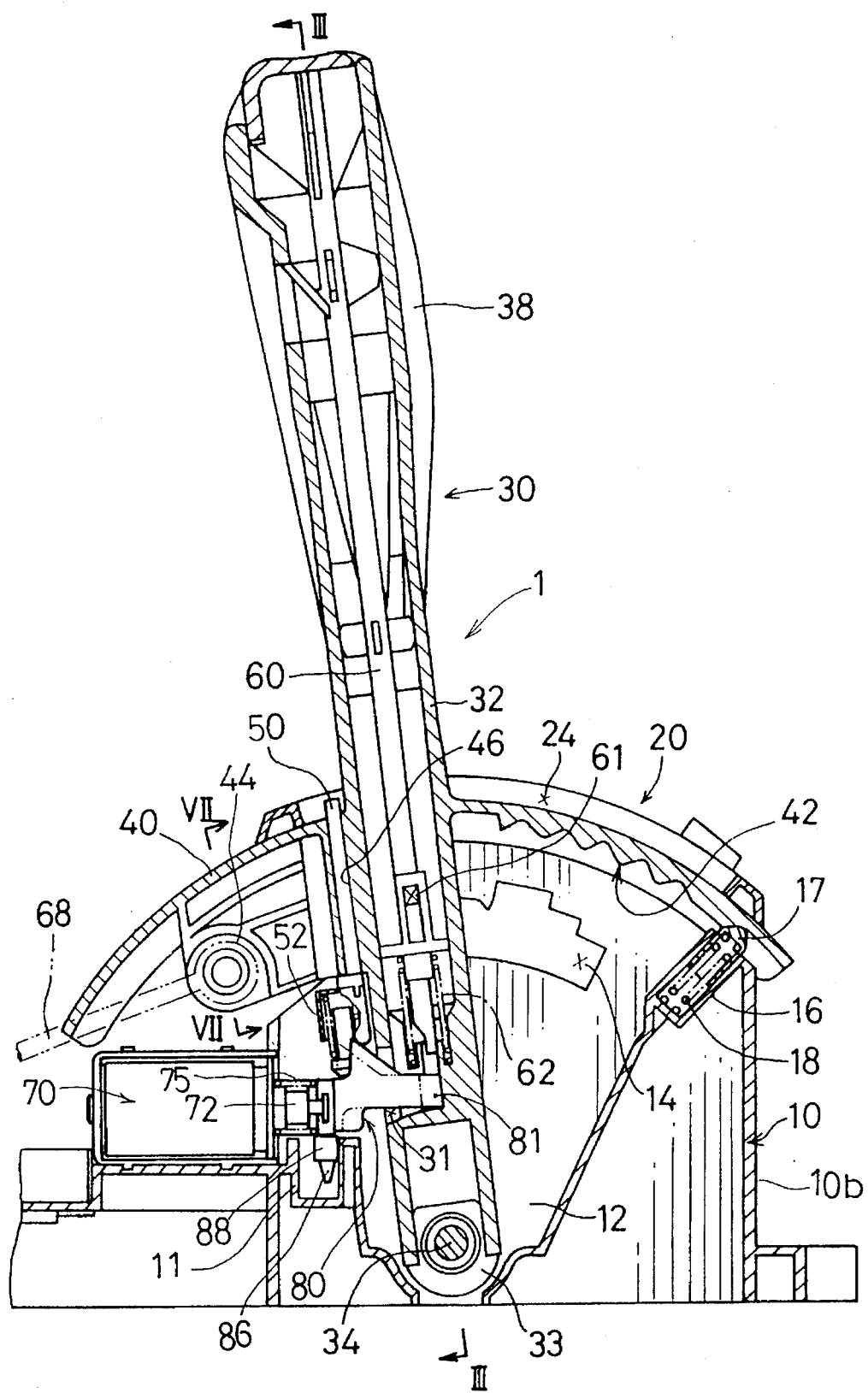
FIG. 2 is a side sectional view showing the same shift lever assembly.
Figure 3:
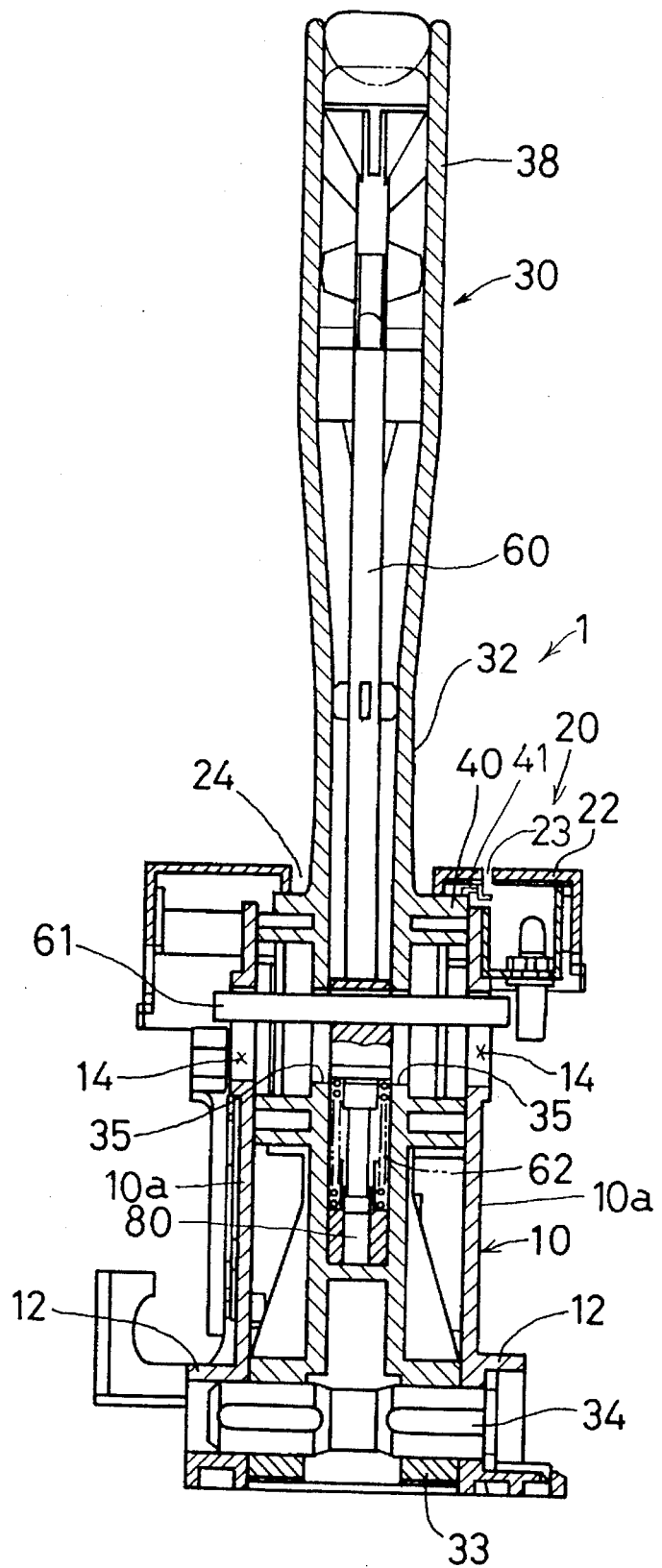
FIG. 3 is a sectional view taken along line III—III in FIG. 2.
Figure 4:
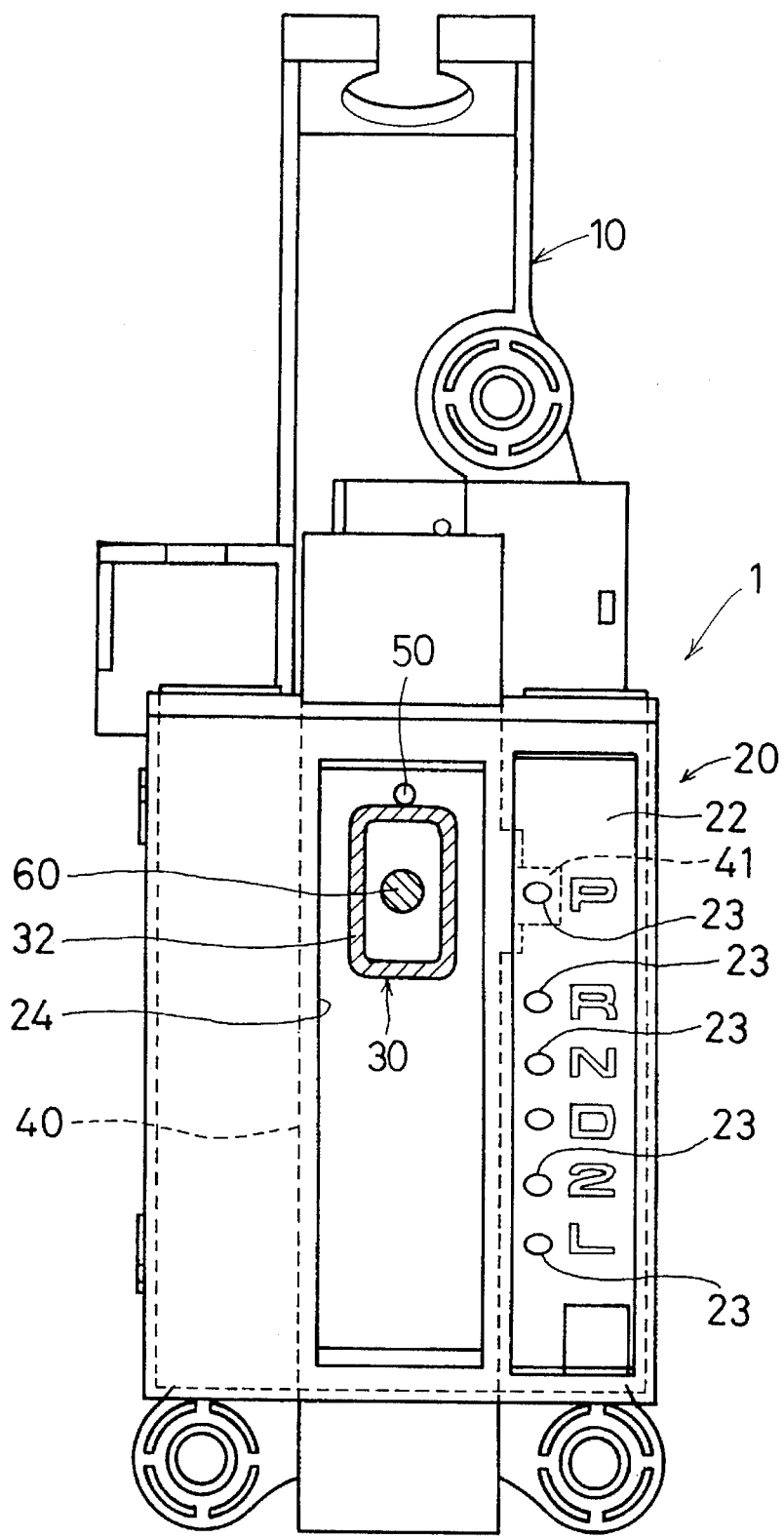
FIG. 4 is a plan view showing the same shift lever assembly.

FIG. 1 is a perspective view showing a shift lever assembly i for an automatic transmission embodying the invention. FIG. 2 is a side sectional view showing the same shift lever assembly. FIG. 3 is a sectional view taken along line III—III in FIG. 2. FIG. 4 is a plan view showing the same shift lever assembly. Referring to these drawings, there is shown a shift lever assembly i which comprises a lever support 10 having a well-known structure. The assembly can be secured to a support such as vehicle body floor (not shown). This lever support 10 is cylindrical with a substantially rectangular sectional profile, and it has a left and a right side wall 10a and a front and a back side wall 10b. Its top surrounded by the walls 10a and 10b are open. It has a lever support portion 12 accommodated at a lower position in its cylindrical inner space and integral with its walls 10a and 10b. A lever body 30 to be described later is pivoted to the lever support portion 12. A shift position indicator 20 is secured to the top of the lever support 10 such as to close the top opening thereof.

As shown in FIG. 4, the shift position indicator 20 has an indication panel 22 having indication windows 23 formed at positions corresponding to respective shift positions of a lever body 30. The indication panel 22 has a black background in which characters P, D, 2 and L are shown in white, character N in green, and character R in orange. The indication windows 23 are transparent and hence colorless. The indication panel 20 has a central opening 24 in which the lever body 30 is found.

Figure 5:
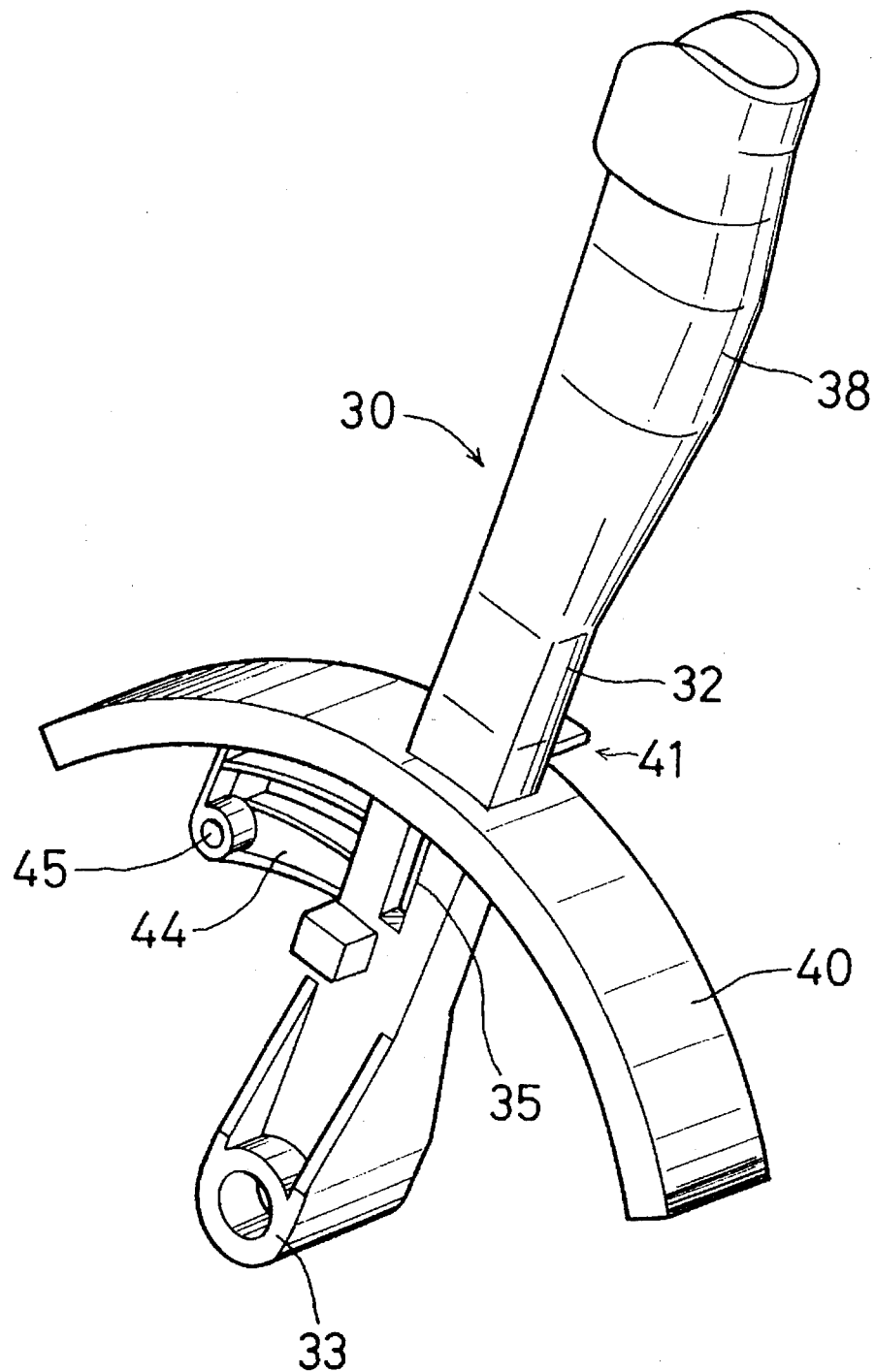
FIG. 5 is a perspective view showing a lever body.

As clearly shown in FIGS. 2, 3 and 5, the lever body 30 has a hollow lever shaft 32, a lever knob 38 formed at the upper end of the lever shaft 32, and a cylindrical boss 33 formed at the lower end of the lever shaft 32 and extending perpendicular thereto. The boss 33 is pivoted by a support shaft 34 to the lever support portion 12 of the lever support 10. As the lever shaft 32 is turned about the axis of the support shaft 34, the lever body 30 is shifted along the opening 24 of the shift position indication panel 20.

As clearly shown in FIG. 5, the lever body 30 includes a slide cover 40 provided on an intermediate portion of the lever shaft 32. As shown in FIGS. 2 and 5, the slide cover 40 has a coupler 44 provided on its underside. An inner wire 68 of a shift cable is coupled to the coupler 44.

FIG. 5 shows the lever body 30 in perspective view. As is seen from the drawing, the lever body 30 is a one-piece molding of a synthetic resin or the like. It has as its integral portions the lever shaft 32, boss 33, lever knob 38, slide cover 40 and coupler 44. As is clear from FIG. 3, the width or transversal dimension of the lever knob 38 is smaller than the width of the opening 24 in the shift position indication panel 20. This means that the lever knob 38 and lever shaft 32 of the lever body 30 can pass through the opening 24 in the shift position indication panel 20.

As shown in FIG. 2, the lever shaft 32 has a guide bore 46 formed on the left side (i.e., on the front side of the lever body 30). The guide bore 46 extends from the front surface of the slide cover 40 to the underside of the coupler 44. A lock release pin 50 for manually releasing the lock of the shift lock mechanism is inserted in the guide bore 46.

A detent rod 60 of a first detent mechanism is accommodated in the inner space of the lever shaft 32 such that it is movable in the axial direction. The detent rod 60 has a detent pin 61 secured to its lower portion such that it extends perpendicular to its axis. As shown in FIG. 5, the lever shaft 32 has an axially elongate opening 35 formed on each side. As shown in FIG. 3, opposite end portions of the detent pin 61 project through the openings 35 to the outside of the lever shaft 32. The projecting ends are found in detent grooves 14 of the first detent mechanism formed in the left and right side walls 10a of the lever support 10. The detent grooves 14 penetrate the opposite side walls 10a of the lever support 10. With this shape of the grooves, a detent action to be described later can be obtained.

The detent rod 60 is biased by the biasing force of a spring 62 as shown in FIGS. 2 and 3 such that it is normally held raised together with the detent pin 61. Thus, the detent pin 61 has each end engaged in an upper edge recess of each detent groove 14. This has the effect of restricting the shifting operation of the lever body 30 as is well known in the art. The restriction or lock against the shifting operation is released by pushing the bottom on top of the detent rod 60 together with the detent pin 61 downward against the biasing force of the spring 62.

The slide cover 40 is located such that it always closes the opening 24 of the shift position indication panel 20. It has a rigidity substantially equal to a predetermined required mechanical strength (rigidity) of the lever body 30. As shown in FIG. 5, the slide cover 40 has an arcuate shape with the center thereof constituted by the center of turning of the lever body 30, i.e., the axis of the support shaft 34. It extends in the front-and-back direction of the lever shaft 32. As shown in FIG. 2, the shift position indication panel 20 is again arcuate in shape with the center thereof constituted by the axis of the support shaft 34 in correspondence to the slide cover 40. Thus, with shifting operation of the lever body 30, the slide cover 40 can be properly moved along the shift position indication panel 20 without the need of any guide groove or the like.

Figure 6A:
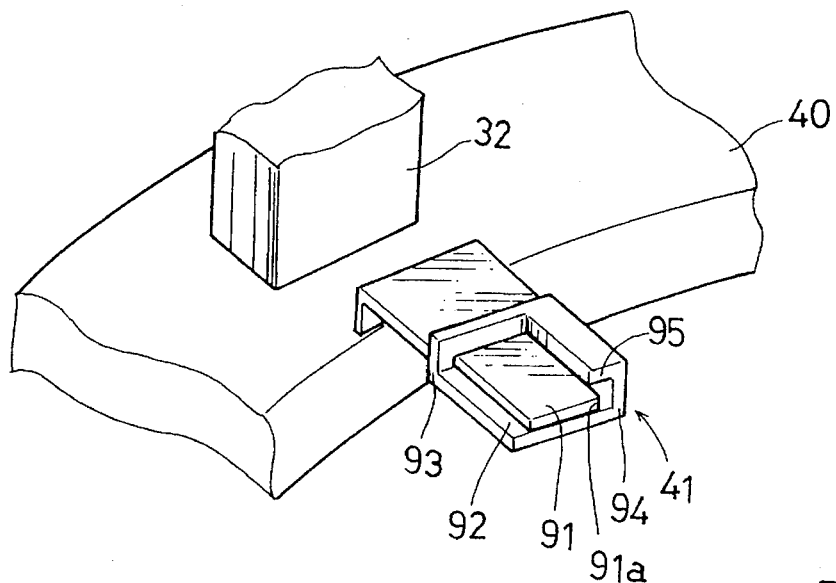
FIG. 6(A) is a perspective view showing a shift position indicator.

As shown in FIGS. 3 to 5, the slide cover 40 has a shift position indicator 41 integral with one side thereof. The shift position indicator 41 is found under a panel member 22 of the shift position indication panel 20. As shown in FIG. 6(A), the shift position indicator 41 has a red indication tape 91 or the like applied to its surface. When it is brought to a position underneath one of the indication windows 23 of the shift position indication panel 20, it indicates the corresponding shift position of the lever body 30.

The red indication tape 91 is a rectangular fluorescent adhesive tape applied to the surface of the shift position indicator 41. With the shift position indicator 41 located underneath an indication window 23 of the shift position indication panel 22, the indication tape 91 can be seen through the indication window 23. In this way, the shift position of the lever body 30 can be confirmed.

As shown in the perspective view of FIG. 6(A), the shift position indicator 41 has a rectangular indication tape accommodating portion 92 having low level side walls 93 and 94 formed along the stem and front edges. A rib-like edge cover portion 95 extends from the top of the front edge portion 94. The indication tape 91 is accommodated in and applied to the indication tape accommodating portion 92 such that its edge 91a is positioned under the edge cover portion 95.

Figure 6B:
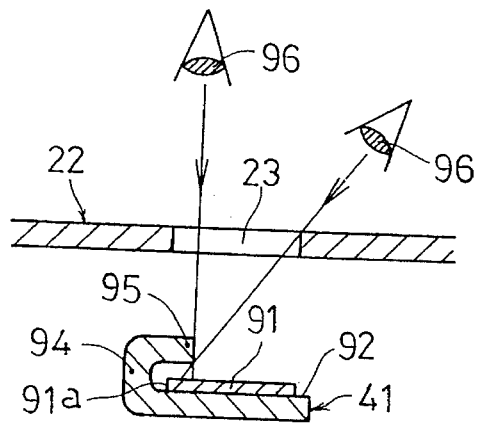
FIG. 6(B) is an explanatory view showing the shift position indicator.

With this shift position indicator 41 of the slide cover 40, as shown in FIG. 6(B), the edge 91a of the indication tape 91 is concealed by the edge cover portion 95 of the shift position indicator 41 when the indicator 41 is seen from a driver's eye point 96 through the indication window 23 in the panel member 22. The other edges of the indication tape 91 than the edge 91a are found such that they can not be seen from the driver's eye point 96.

Thus, even if the application position of the indication tape 91 with respect to the indication tape accommodation portion 92 of the shift position indicator 41 is slightly deviated, the edge 91a of the indication tape 91 is not seen, but the edge of the edge cover portion 95 is seen as virtual edge of the indication tape 91. It is thus possible to permit the indication to be clearly observed. In addition, it is possible to alleviate the core that would be required in the operation of applying the indication tape 91 in the prior art, thus obtaining improved operability.

As shown in FIG. 2, the back surface (i.e., underside) of the slide cover 40 is formed with a detent groove 42 for a second detent mechanism. The detent groove 42 has alternate hills and valleys recurring in the direction of the shifting operation. A plunger 17 which is assembled in a plunger holder 16 provided on a side of the lever support 10, is held pushed against the detent groove 42 by the biasing force of a spring 18.

In this second detent mechanism 42, the relative positions of the hills and valleys of the detent groove 42 and the plunger 17 are changed with the shifting operation of the lever body 30. Thus, a nodal sense is obtained in the shifting operation of the lever body 30.

In the prior art second detent mechanism, since a guide member or restricting member for guiding movement of a slide cover is provided under a shift position indication member, a detent engagement portion is formed on, for instance, the lever support side below the guide or restricting member, i.e., on the side of the center of turning of the lever body 30, and a plunger to be pushed against hills and valleys of the detent engagement portion is provided on the lever body side.

In contrast, in this embodiment, the detent groove 42 of the second detent mechanism is formed by making use of the underside of the slide cover 40. This means that the second detent mechanism is disposed at a position spaced apart from the axis of the support shaft 34 which constitutes the center of turning of the lever body 30. It is thus possible to readily adjust the detent load or the like as required.

In this embodiment, the slide cover 40 is moved in unison with the lever body 30 in a shifting operation thereof, and it is thus possible to obtain accurate correspondence between the shift position of the lever body 30 and that of the slide cover 40.

Further, in this embodiment the shift position indication panel does not require any guide groove or other position regulation means for guiding the slide cover, while the slide cover may be made of an inexpensive material. It is thus possible to reduce the cost of the shift lever assembly for an automatic transmission.

Further, in this embodiment, the slide cover 40 shares part of the function of the second detent mechanism. It is thus possible to set the second detent mechanism at a position comparatively remote from the center of turning of the lever body 30 for shifting operation. It is thus possible to permit ready adjustment of the detent load to meet required characteristics.

Figure 7:
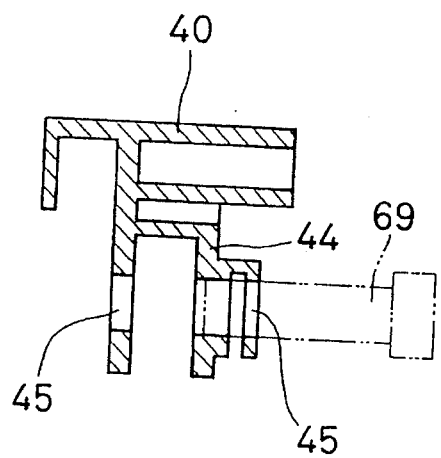
FIG. 7 is a sectional view taken along line VII—VII in FIG. 2.

FIG. 7 is an enlarged-scale sectional view taken along line VII—VII in FIG. 2. As shown, the coupler 44 has a hole 45. The end of the inner wire 68 of a shift cable as shown in FIG. 2 is coupled to the coupler 44 by a coupling pin 69 of a synthetic resin which is inserted through the hole 45. The other end of the inner wire 68 is coupled to a shift arm (not shown) of the automatic transmission, thus permitting a desired speed shift to be obtained by a shifting operation of the lever body 30.

Now, a shift lock mechanism will be described, which serves to lock the detent rod 60 against downward displacement when the lever body 30 is in the parking position P.

As shown in FIG. 2, the shift lock mechanism includes a solenoid 70 which is provided as an electric actuator on the lever support 10 such as to be electrically interlocked to whether or not a brake pedal of a vehicle is operated, and a solenoid rod 80 as a restricting member for restricting axial displacement of the detent rod 60. The solenoid 70 is controlled by a control computer (not shown). Specifically, when the vehicle brake pedal is depressed with the lever body 30 in the parking position P, the solenoid 70 is energized to pull in a plunger 72. When the brake pedal is released, the solenoid 70 is de-energized.

Figure 8:
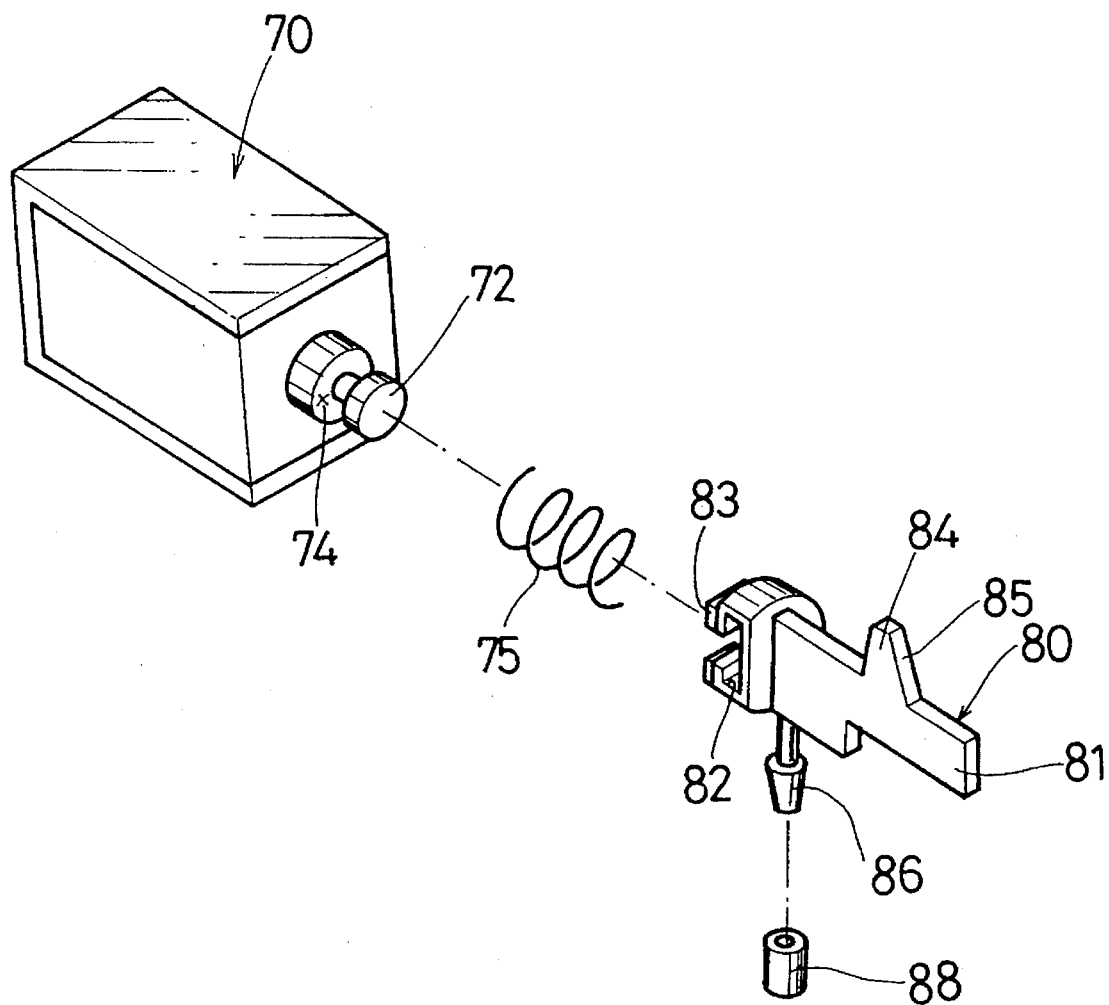
FIG. 8 is an exploded perspective view showing the assembling relation of a solenoid and a solenoid rod to each other.

The plunger 72 of the solenoid 70 and the solenoid rod 80 are coupled to each other as follows. As shown in the exploded perspective view of FIG. 8, the plunger 72 has an annular groove 74 formed in its end portion. On the other hand, the solenoid rod 80 has a stem portion formed with a mounting groove 82 open on one side also with a flange 83 to be engaged in the annular groove 74 noted above. The solenoid 70 and the solenoid rod 80 are directly coupled to each other by the engagement of the flange 83 in the annular groove 74 of the end of the plunger 72 and also fitting in the mounting groove 82 in the radial direction thereof. When effecting this direct coupling, a spring 75 is fitted on the plunger 72. The spring 75 is fitted such that it is found between the solenoid 70 and the solenoid rod 80 and biases the solenoid rod 80 in an advancing direction.

The solenoid rod 80 has a hill-like projection 84 formed on the top of its central portion. The hill-like projection 84 has a front inclined face 85 serving as cam face. The solenoid rod 80 further has a wedge-shaped projection 86 depending from its central portion. A cushion ring 88 made of rubber is fitted on a neck of the projection 86.

As shown in FIG. 2, the solenoid 70 is disposed on the front side of the lever body 30 such that the plunger 72 is directed rearward. A rear end 81 of the solenoid rod 80 directly coupled to the plunger 72 is engaged as a lock portion in an opening 31 formed in the front side wall of the lever body 30 near the stem thereof. With operation of the solenoid 70, the lock portion 81 of the solenoid rod 80 is advanced and retreated between a lock position right underneath the lower end of the detent rod 60 and a lock release position (shown by phantom lines in FIG. 2) retreated from the lock position. That is, the solenoid rod 80 is disposed near the center of turning of the lever body 30 for advancement and retreat with respect to the plane of turning orbit of the lever body 30. The turning orbit plane extends in the forward and rearward directions of the vehicle.

The projection 86 of the solenoid rod 80 is engaged in a guide recess 11 provided in the lever support 10 for advancement and retreat in the recess 11 with operation of the solenoid 70. When the solenoid rod 80 is advanced and retreated, the cushion ring 88 provides a cushioning function in contact with the front and rear walls of the guide recess 11.

Figure 9:
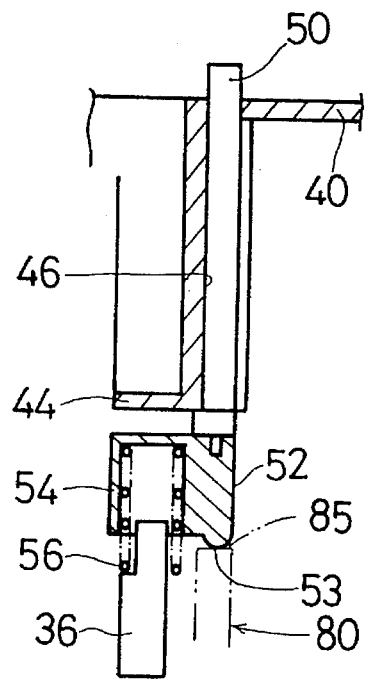
FIGS. 9 and 10 are explanatory views for describing the operation of a lock release pin.
Figure 10:
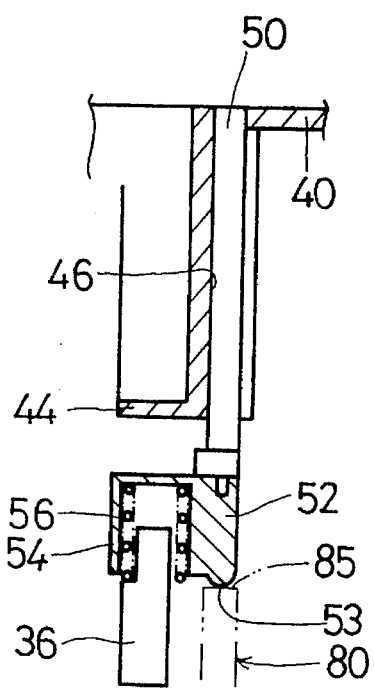
Figure 11:
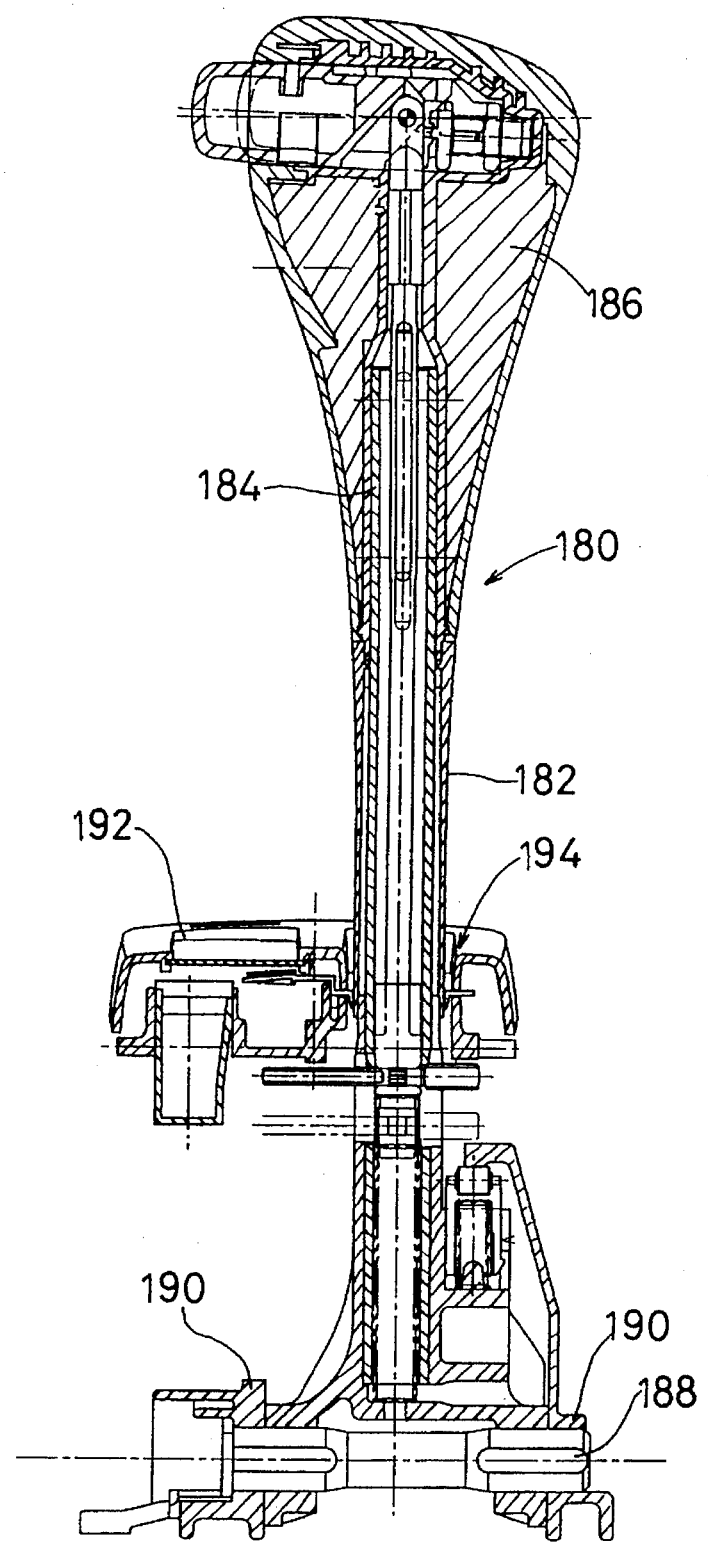
FIG. 11 is a sectional view showing a prior art example of a shift lever assembly for an automatic transmission.
Figure 12:
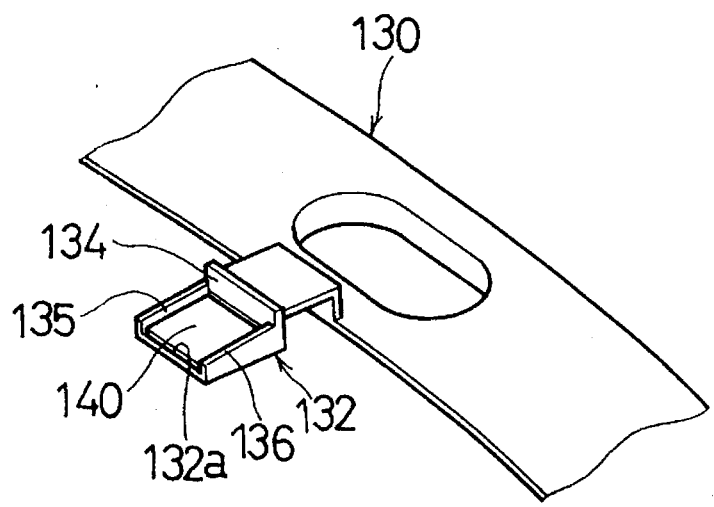
FIG. 12 is a perspective view showing a shift position indicator in the prior art shift lever assembly.
Figure 13:
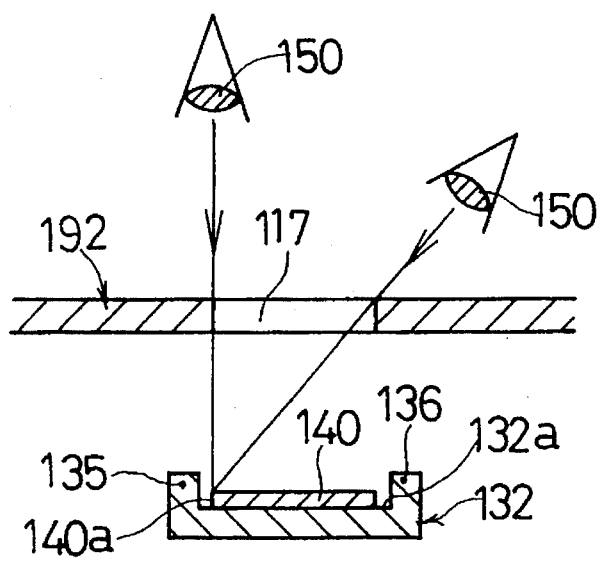
FIG. 13 is an explanatory view for describing the shift position indicator in the prior art shift lever assembly.
Figure 14:
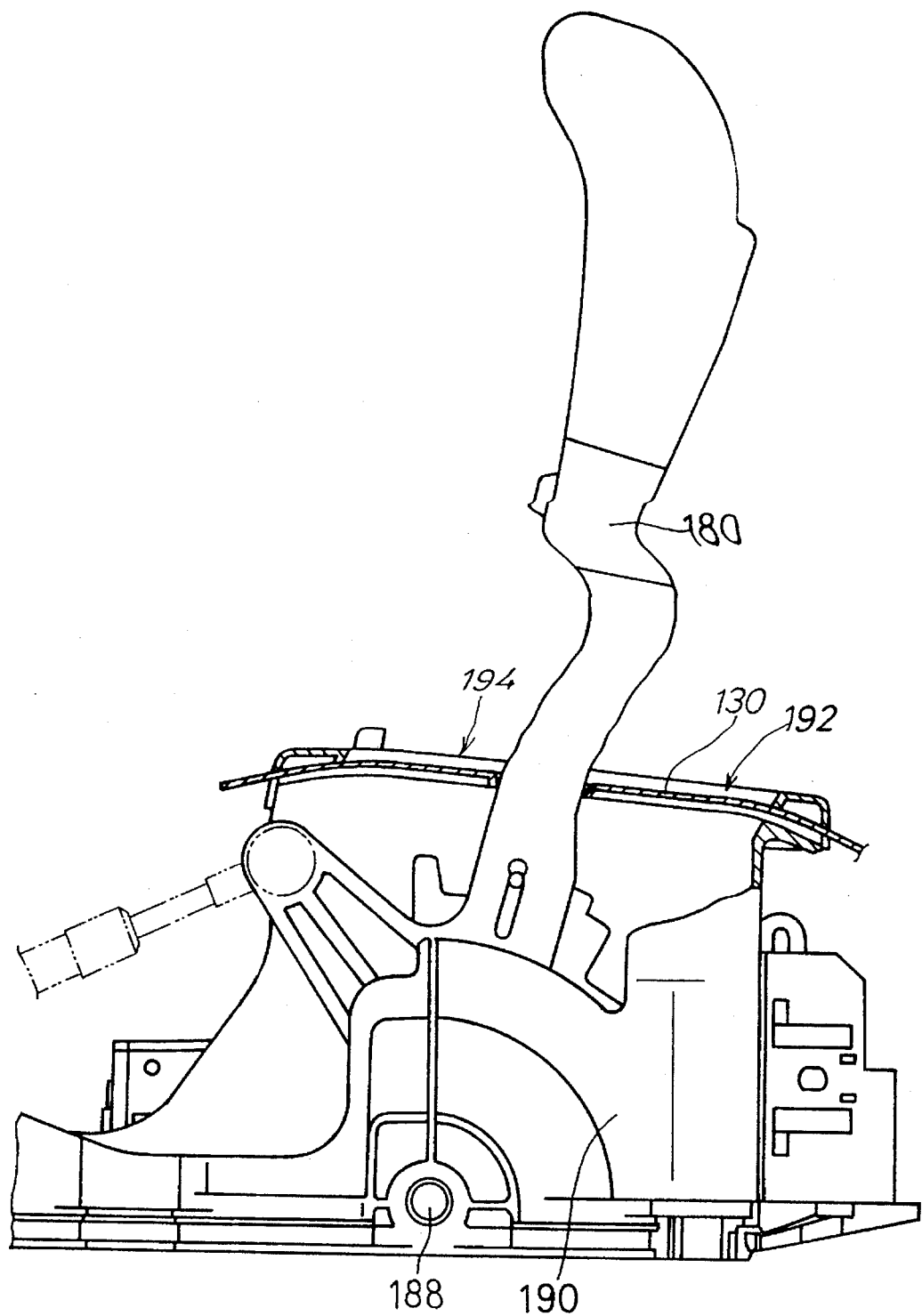
FIG. 14 is a sectional view showing the prior art example of a shift lever assembly for an automatic transmission.
Figure 15:
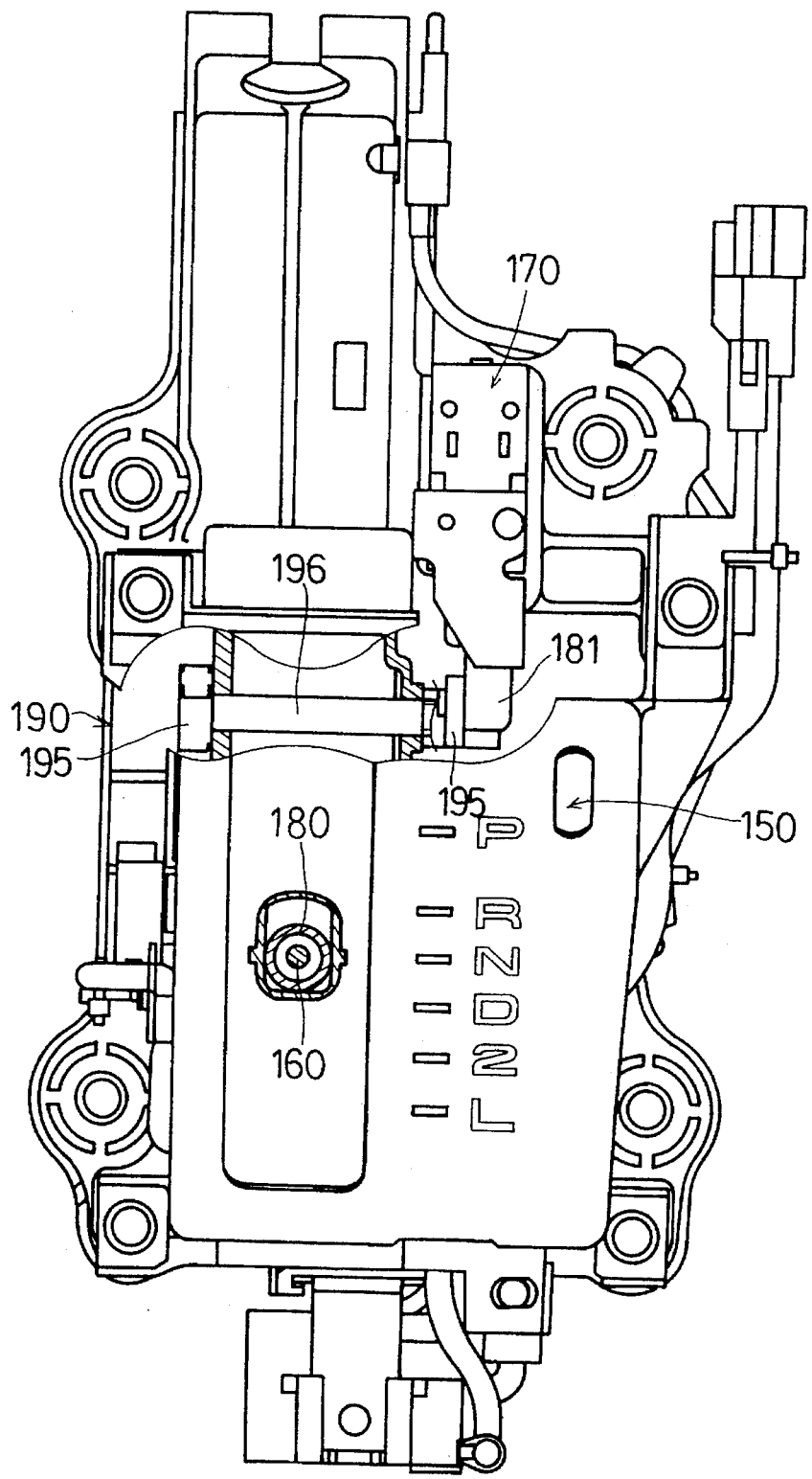
FIG. 15 is a plan view showing the same prior art shift lever assembly.
Figure 16:
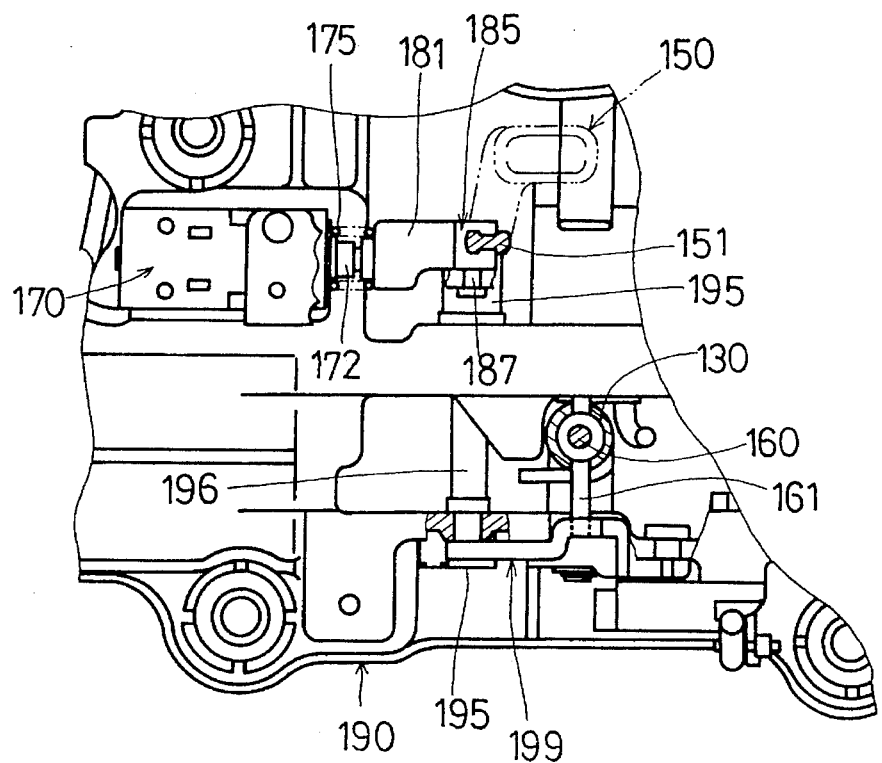
FIG. 16 is a plan view showing the same prior art shift lever assembly.
Figure 17:
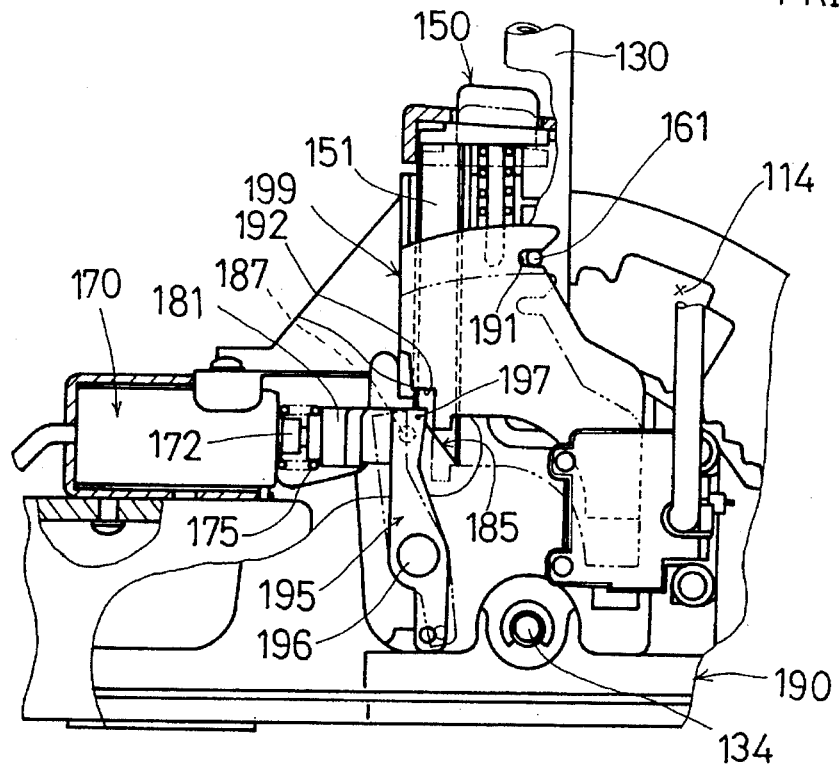
FIG. 17 is a side view showing the same prior art shift lever assembly.

As shown in the sectional views of FIGS. 9 and 10, the lock release pin 50 has an operating member 52 mounted on its lower end. It is shown in its normal state in FIG. 9 and in an operated state in FIG. 10. The operating member 52 has a cam protuberance 53 formed at its lower end and facing the cam face 85 of the solenoid rod 80. It also has a cylindrical recess 54 formed on one side of the cam protuberance 53 and open at the bottom. A guide shaft 36 which is integral with the lever shaft 32 and the coupler 44, is substantially coaxially fitted in the cylindrical recess 54. Between the cylindrical recess 54 and the guide shaft 36, a spring 56 is provided to upwardly bias the lock release pin 50. When the lock release pin 50 is pushed down from the state shown in FIG. 9 to the state shown in FIG. 10 against the biasing force of the spring 56, the cam protuberance 53 is brought into frictional contact with the cam face 85 of the solenoid rod 80. Thus, the solenoid rod 80 can be retreated against the biasing force of the spring 75.

In the shift lock mechanism as described, when the brake pedal is not depressed with the lever body 30 in the parking position P, if it is intended to push down the detent rod 60, the downward movement thereof is blocked by the contact between the lower end of the rod 60 and the lock portion 81 of the solenoid rod 80. It is thus impossible to release the lock of the first detent mechanism, and the lever body 30 cannot be shifted from the parking position P to a different position.

When the brake pedal is depressed in this state, the solenoid 70 is energized in an interlocked fashion. The solenoid rod 80 is thus pulled in together with the plunger 72 against the force of the spring 75. The lock portion 81 of the solenoid rod 80 is thus retreated to the lock release position as shown by the phantom lines in FIG. 2, thus bringing about a lock release state. The lock release can also be realized by manually pushing down the lock release pin 50.

In the lock release state, the lock of the first detent mechanism can be released by downwardly displacing the detent rod 60, thus permitting the lever body 30 to be shifted from the parking position P to a different position.

In its state shifted to a different position, the lever body 30 is shifted to the parking position P again with the detent rod 60 in the downwardly displaced state. When the detent rod 60 is restored upward, the shift lock mechanism is brought to the lock state again.

In the shift lock mechanism as described, it is the sole solenoid rod 80 that is provided as an intermediate member between the solenoid 70 and the detent rod 60. Thus, the number of intermediate parts is minimized, and this solves various problems in the prior art construction where there are many intermediate parts. Improvements that are obtainable in this connection are as follows.

(1) The construction can be simplified.

(2) It is readily possible to make the construction compact.

(3) It is possible to reduce cost.

(4) It is possible to increase the productivity.

(5) It is possible to reduce fluctuations of the lock range of the shift lock and readily ensure a given accuracy of the lock range.

(6) Frictional resistances produced in coupling portions of intermediate parts can be reduced, thus providing for improved operability and also improved feel of manually pushing of the lock release pin.

Further, since the solenoid rod 80 is disposed near the center of turning of the lever body 30 such that it can be advanced and retreated in the turning orbit plane directions of the lever body 30, the solenoid rod 80 can be disposed near the center of turning of the lever body 30 such that it forms a serial arrangement with the lever body 30 and the solenoid rod 80. This arrangement is effective for making the shift lever assembly compact in the width direction thereof.

Further, in the assembling of the shift lever components assembly having the construction as described above, the lever body 30 is mounted on the lever support 10 such that it is capable to perform a shifting operation before assembling the shift position indication panel 20 over the lever support 10 by passing the lever knob 38 and the lever shaft 32 of the lever body 30 through the opening 24 of the indication panel 20. As a result, the opening 24 of the shift position indication panel 20 is closed by the slide cover 40, and the shift position indicator 41 is found under the indication plate member 22.

The lever body 30 is locked against a shifting operation by the first detent mechanism as noted above depending on its shift position. In this case, the detent rod 60 of the first detent mechanism is pushed down to cause the detent pin 61 to get out of a valley of the detent groove 14. In this state, the lever body 30 is turned about the axis of the support shaft 34.

When the lever body 30 has been shifted to a desired shift position, the downward force of the detent rod 60 is released. As a result, the detent rod 60 is pushed upward by the spring 62. Thus, the detent pin 61 is engaged in a valley of the detent groove 14 corresponding to the shift position of the lever body 30 at this time. In this way, the lever body 30 is locked at that shift position.

Further, by a shifting operation of the lever body 30, the slide cover 40 is moved such that it closes the opening 24 of the shift position indication panel 20 at all times. As described before, the shift position of the lever body 30 is indicated by the shift position indicator 41 of the slide cover 40 and the shift position indication panel 20. Further, the second detent mechanism provides for a nodal sense as noted above to the shifting operation.

According to the invention, the lever knob of the lever body has a dimension such that it can pass through the opening of the shift position indication panel and is integral with the lever shaft of the lever body. It is thus possible to obtain increased positioning accuracy of the lever shaft. Besides, the assembling of the shift lever components does not require any step of coupling a separate lever knob to a lever shaft, thus realizing improved productivity.

While the invention has been described in conjunction with a preferred embodiment thereof, it is to be understood that various changes and modifications may be made in the details of the construction without departing from the scope of the invention as claimed in the accompanying claims.

What is claimed is:

1. A shift lever assembly for an automatic transmission comprising:

a sub-assembly which can be secured to a vehicle body, and a shift position indication panel;

said sub-assembly including a lever support having a substantially cylindrical shape with peripheral walls open at the top and a bottom;

a lever body pivotally supported by said lever support, said lever body extending upward beyond the open top of said lever support and pivotally mounted within said substantially cylindrical lever support;

said lever body being formed as an integral part including a hollow lever shaft, a lever knob at the upper shaft end, and a cylindrical boss at the lower shaft end;

said shift position indicating panel having a predetermined width opening, elongated in a direction of turning said pivotally mounted lever body;

said lever knob having a width smaller than the predetermined width of the opening in said shift position indication panel so that the shift position indication panel can be lowered over the sub-assembly, the lever knob protruding from the opening, said shift position indicating panel closing the lever support open top when secured thereto.

2. The shift lever assembly according to claim 1, wherein said lever body further includes a slide cover integrally formed with the lever shaft and the lever knob, said slide cover and said shift position indication panel being arcuate with a center constituted by the pivoting center of said lever body.

3. The shift lever assembly according to claim 2, wherein said slide cover includes a shift position indicator formed on one side thereof, said shift position indicator having a shift position indication tape accommodating portion and an edge cover portion extending thereover.

4. The shift lever assembly according to claim 1, wherein:

said lever body includes a detent rod extending in a longitudinal direction thereof for axial displacement; and said lever support includes a lock release actuator secured thereto, said lock release actuator being capable of causing displacement of a solenoid rod in a direction substantially at right angles to the longitudinal direction of said detent rod;

said solenoid rod being advanced under said detent rod to prohibit downward displacement thereof when said actuator is an in "off" state, and being retreated from a downward displacement orbit of said detent rod to allow downward displacement of said detent rod when said actuator is turned on.

5. The shift lever assembly according to claim 4, wherein said actuator is accommodated in the pivoting plane of said lever body.

6. The shift lever assembly according to claim 4, wherein:

said lever body includes a lock release pin slidably accommodated therein and having a lower end formed with a cam projection; and said solenoid rod is formed with an inclined cam face contactable with said cam projection of said lock release pin so that displacement of said solenoid rod to a retreated position is caused by downward displacement of said lock release pin.

7. The shift lever assembly according to claim 2, wherein said slide cover has a detent groove formed in its back surface.

8. A shift lever assembly for an automatic transmission comprising:

a lever support which can be secured to a vehicle body having a substantially cylindrical shape with a peripheral wall and open at the top;

a lever body pivotally supported by said lever support, said lever body extending upward beyond the open top of said shift lever support and being capable of being turned within said substantially cylindrical lever support;

a shift position indication panel to be secured to said shift lever support for closing said open top and having an opening elongate in the direction of turning of said lever body, said lever body being inserted through the opening;

said lever body including a lever shaft and a lever knob formed integral therewith;

said lever knob having a width smaller than the width of the opening in said shift position indication panel and thus capable of being inserted through the opening in said shift position indication panel in a state where said lever body is pivotally mounted on said lever support, said lever body includes a slide cover in addition to the lever shaft and the lever knob, said slide cover and said shift position indication panel being arcuate with a center constituted by the turning center of said lever body, and said slide cover including a shift position indicator formed on one side thereof, said shift position indicator having a shift position indication tape accommodating portion and an edge cover portion extending thereover.

9. The shift lever assembly according to claim 1, wherein:

said lever body includes a detent rod extending in a longitudinal direction thereof for axial displacement; and said lever support includes a lock release actuator secured thereto, said lock release actuator being capable of causing displacement of a solenoid rod in a direction substantially at right angles to the longitudinal direction of said detent rod;

said solenoid rod being advanced under said detent rod to prohibit downward displacement thereof when said actuator is in an "off" state, and being retreated from a downward displacement orbit of said detent rod to allow downward displacement of said detent rod when said actuator is turned on.

10. The shift lever assembly according to claim 9, wherein said actuator is accommodated in the turning plane of said lever body.

11. The shift lever assembly according to claim 9, wherein:

said lever body includes a lock release pin slidably accommodated therein and having a lower end formed with a cam projection; and said solenoid rod is formed with an inclined cam face contactable with said cam projection of said lock release pin so that displacement of said solenoid rod to a retreated position is caused by downward displacement of said lock release pin.

12. The shift lever assembly according to claim 1, wherein said slide cover has a detent groove formed in its back surface.

* * * * *